(12) United States Patent
Shenoy

(10) Patent No.: US 11,477,044 B2
(45) Date of Patent: Oct. 18, 2022

(54) DEVICE NOTIFICATION GROUPINGS

(71) Applicant: VMware, Inc., Palo Alto, CA (US)

(72) Inventor: Pranav Ashok Shenoy, Bangalore (IN)

(73) Assignee: VMware, Inc., Palo Alto, CA (US)

( * ) Notice: Subject to any disclaimer, the term of this patent is extended or adjusted under 35 U.S.C. 154(b) by 0 days.

(21) Appl. No.: 17/142,042

(22) Filed: Jan. 5, 2021

(65) Prior Publication Data
US 2022/0217007 A1 Jul. 7, 2022

(51) Int. Cl.
*G06F 15/16* (2006.01)
*H04L 12/18* (2006.01)
*H04L 41/0893* (2022.01)
*H04L 67/303* (2022.01)
*H04L 41/082* (2022.01)

(52) U.S. Cl.
CPC ........ *H04L 12/185* (2013.01); *H04L 12/1859* (2013.01); *H04L 12/1895* (2013.01); *H04L 41/082* (2013.01); *H04L 41/0893* (2013.01); *H04L 67/303* (2013.01)

(58) Field of Classification Search
CPC ............... H04L 12/185; H04L 12/1895; H04L 41/0893; H04L 41/082
USPC .......................... 709/206, 207, 220, 223, 224
See application file for complete search history.

(56) References Cited

U.S. PATENT DOCUMENTS

| | | | | |
|---|---|---|---|---|
| 2009/0077045 A1* | 3/2009 | Kirchmeier | ............. | H04L 67/18 707/E17.069 |
| 2013/0157609 A1* | 6/2013 | Vainik | ..................... | H04W 4/90 455/404.1 |
| 2015/0230063 A1* | 8/2015 | Chandramouli | .... | H04L 12/1845 455/466 |
| 2016/0173631 A1* | 6/2016 | McKay | ................. | H04L 67/306 709/203 |
| 2016/0320195 A1* | 11/2016 | Liu | ......................... | G06Q 50/01 |
| 2021/0243150 A1* | 8/2021 | Vasamsetti | ............ | H04L 12/185 |

* cited by examiner

*Primary Examiner* — Lan Dai T Truong
(74) *Attorney, Agent, or Firm* — Thomas | Horstemeyer LLP

(57) ABSTRACT

A notification system is described herein. Notifications can be generated for groupings of devices. A notification indication can be sent to a larger grouping of client devices. The notification indication can include one or more grouping parameters that specify one or more conditions that define a smaller device grouping. Devices that fall within the grouping can request the notification from a messaging service or management service.

21 Claims, 4 Drawing Sheets

DEVICE NOTIFICATION GROUPINGS

BACKGROUND

In enterprise settings, client devices can be managed by a management service. To aid in the management of users and devices, some management services and directory services allow for the creation of user groups and/or device groups. Additionally, dynamic groups can be created that automatically placed devices or users into groups based on one or more parameters, such as device type, operating system, role, title, etc.

Management of users and devices can be facilitated by creation of these groups by allowing an administrator to deploy applications, profiles, policies, or other data to users and devices based upon group membership. Using group membership to manage users and devices can be more efficient that requiring the administrator to manage users and devices individually. For example, the administrator can deploy an application to a grouping of devices based upon their group membership rather than forcing the administrator to deploy the application to devices individually, saving the administrator considerable time. Additionally, the administrator can deploy other policies and data to groups, saving additional time.

Information technology (IT) administrators might require that users enroll their devices as managed device with a remotely executed management service. Once enrolled, a managed device can receive notifications from the management service to receive management commands and other data. For example, management commands can cause applications, settings, or profiles to be installed on the client device. Push notifications are often implemented through a polling methodology. In other words, a client device actually polls the server (e.g. a management service) on a periodic basis and retrieves a notification when one is available. In this scenario, a push notification seems instantaneous, but the push framework is actually implemented through repeated polling of the server.

Even still, notifications are issued to groupings of devices, the management service or message server might have to determine which devices within the grouping should receive the notification, which can cost computing resources each time a notification is issued to a grouping of devices.

BRIEF DESCRIPTION OF THE DRAWINGS

Various aspects of the present disclosure can be better understood with reference to the following drawings. The components in the drawings are not necessarily to scale. Emphasis is placed upon clearly illustrating various features of the present disclosure. Moreover, in the drawings, like reference numerals designate corresponding parts throughout the several views.

DETAILED DESCRIPTION

Figure 1:
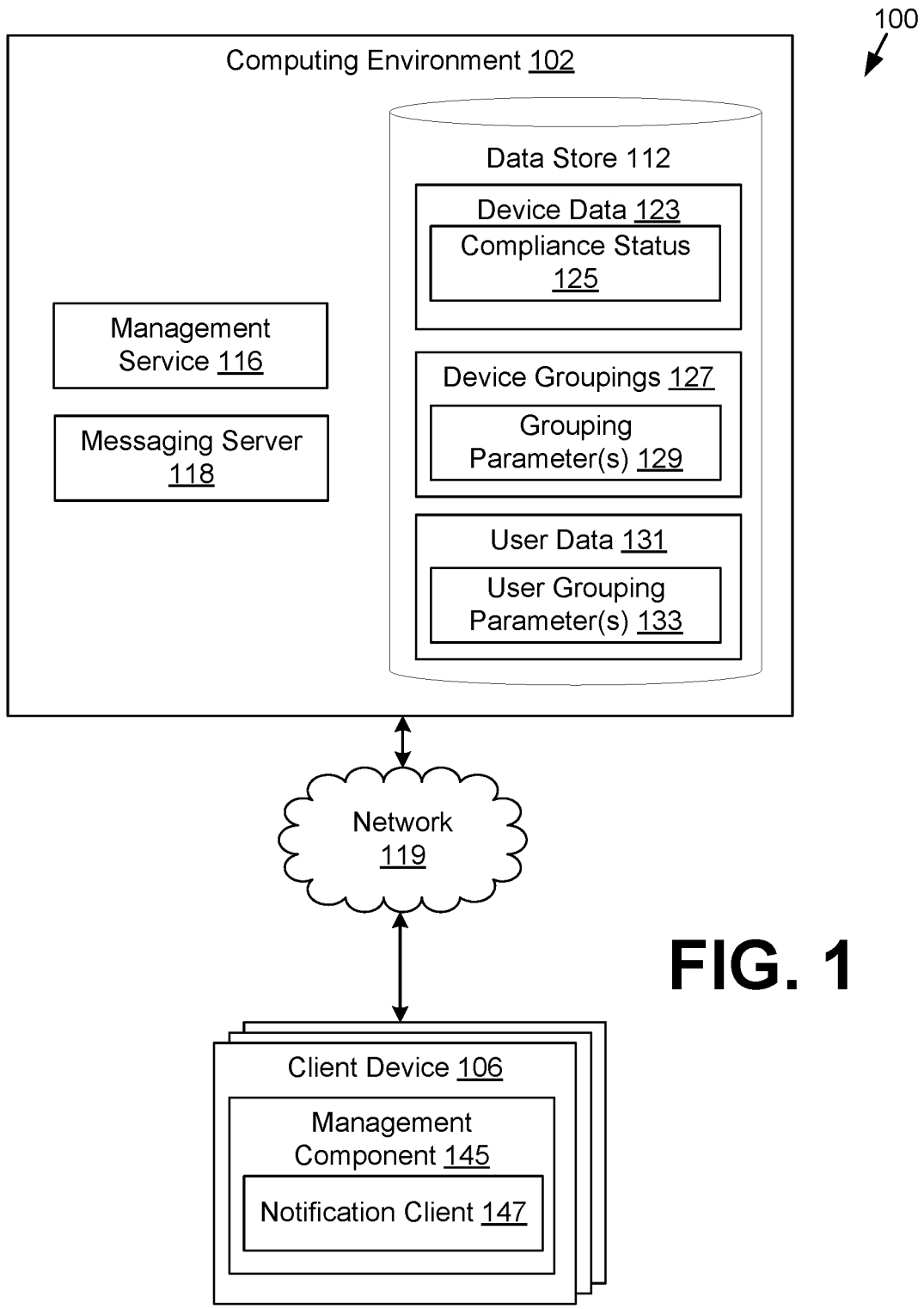
FIG. 1 is a block diagram of a networked environment according to examples of the disclosure.

Users in an enterprise environment can be granted access by information technology (IT) administrators to enterprise resources, such as mail, files, and other resources. Users can utilize their own devices or devices issued by the enterprise to access company resources. Administrators might require that enterprise issued devices or devices brought by the user be enrolled as managed devices with a management service.

A management service can be run on a server or group of servers that are remote from the users' devices. The management service can allow administrators to manage users' devices to a certain degree. The management service, working in conjunction with a management component running on the users' devices, can install applications, profiles, settings, and make changes and adjustments to the user's devices. To accomplish management of user devices, the management service can send push notification to enrolled client devices.

A push notification framework that allows a remotely executed server to communicate with client devices can be accomplished in various ways. In some examples, a polling methodology can be utilized whereby a client device polls a server on a periodic basis. In other examples, a persistent connection can be maintained between a client device and a notification server for the purpose of exchanging communications, including push notifications, between the two devices. In other scenarios, a notification application programming interface (API) provided by an operating system can perform notifications on behalf of applications running on the device and servers that communicate with those applications.

Additionally, the management service can allow devices and/or users to be placed into groupings according to various grouping parameters. Devices can be grouped by their location, device model, operating system, operating system version, device type, role, or other parameters. Users can be grouped by location, role within an organization, job title, or other parameters that an administrator can define.

Sending notifications to client devices can require significant resources to be utilized by a server. In the case of periodic or near-constant polling from client devices so that notifications are near-instantaneous, the server would have to service many network requests from each client device to which it is providing notifications. In the case of a persistent communications channel, the server is required to maintain a persistent connection for each device to which it sends notifications. Either scenario requires computing and networking resources.

Additionally, the management service might need to send notifications or data to a certain grouping of devices. In some cases, there can be many parameters that define a grouping of devices. Accordingly, the management service can be required to ascertain which devices are in the grouping based on the grouping parameters that define the grouping. Certain devices might be in multiple groups and have multiple grouping parameters that define the various groups in which they have membership. Additionally, the population of managed devices and users can be quite large. Accordingly, generating notifications that are targeted to the correct population of devices in a grouping can require significant computational complexity on the part of a management service.

Therefore, examples of the disclosure can provide a mechanism to reduce the computational load in a management service or a messaging server tasked with distributing notifications to managed devices. The computing load can be distributed to client devices that are receiving notifications. When a notification to a grouping of client devices is generated by a management service, an indication that a notification is available can be sent to all client devices in an enterprise or a larger organizational group that a notification is available. The indication can include the grouping parameters that define a smaller grouping of client devices, and a notification client running on the client devices can determine whether the client device is within the grouping. If the notification client determines that the client device is within the grouping, the notification client can request the notification or data from the management service.

FIG. 1 depicts a networked environment 100 that includes a computing environment 102 and one or more client devices 106, which can be in communication over a network 119. The client devices 106 can be devices to which the computing environment 102 sends push notifications, such as devices that are managed by a management service 116 running on the computing environment 102. The network 119 can include, for example, the Internet, one or more intranets, extranets, wide area networks (WANs), local area networks (LANs), wired networks, wireless networks, other suitable networks, or any combination of two or more such networks. For example, the networks can include satellite networks, cable networks, Ethernet networks, and other types of networks.

The computing environment 102 can comprise, for example, a server computer or any other system providing computing capability. Alternatively, the computing environment 102 can employ a plurality of computing devices that can be arranged in one or more server banks, computer banks or other arrangements. The computing devices can be in a single installation or can be distributed among different geographical locations. For example, the computing environment 102 can include a plurality of computing devices that can collectively comprise a hosted computing resource, a grid computing resource and/or any other distributed computing arrangement. In some cases, the computing environment 102 can correspond to an elastic computing resource where the allotted capacity of processing, network, storage, or other computing-related resources can vary over time. The computing environment 102 can also include or correspond to one or more virtualized server instances that are created to execute the functionality that is described herein.

Various applications or other functionality can be executed in the computing environment 102. Also, various data can be stored in a data store 112 that can be accessible to the computing environment 102. The data store 112 can be representative of a plurality of data stores 112. The data stored in the data store 112 can be associated with the operation of the various applications or functional entities described below.

The components executed on the computing environment 102 can include a management service 116, messaging server 118, and other applications, services, processes, systems, engines, or functionality not discussed in detail herein. The management service 116 can monitor and oversee the operation of one or more client devices 106 by administrators. In some examples, the management service 116 can represent one or more processes or applications executed by an enterprise mobility management (EMM) provider that facilitates administration of client devices 106 of an enterprise that are enrolled with the EMM provider. To this end, the operating system and application ecosystem associated with the client device 106 can provide various APIs and services that allow client devices 106 to be enrolled as managed devices with the management service 116.

The management service 116 can include a management console that can allow administrators to manage client devices 106 that are enrolled with the management service 116. User interfaces can allow an administrator to define policies for a user account or devices associated with an enterprise environment. The user interfaces can also include, for example, presentations of statistics or other information regarding the client devices 106 that can be managed by the management service 116.

The messaging server 118 can be an application or service that is tasked with sending notifications to client devices 106. The messaging server 118 can implement messaging or notifications protocols that are defined by an operating system or other requirements associated with the client device 106. For example, a client device 106 running iOS might be required to use Apple Push Notification Service (APNS) or a device-specific notification or messaging framework to receive notifications. Accordingly, the messaging server 118 can implement server-side requirements of the messaging framework to send notifications to the client device 106. As another example, an Android or Windows device might be required to utilize a different messaging and notifications framework, so the messaging server 118 can implement the framework to send notifications to these managed devices. In some implementations, the functionality of the messaging server 118 can be integrated into the management service 116, and the separation of the functionality shown in FIG. 1 is just one example implementation.

The data stored in the data store 112 can include device data 123, device groupings 127, user data 131, and potentially other data. Device data 123 can include records to client devices 106 that are enrolled as managed devices with the management service 116. A record within device data 123 can include various security settings selected for enforcement on a client device 106 that is enrolled with the management service 116. Accordingly, a device record can include a device identifier associated with a device, such as the client device 106, one or more device certificates, and a compliance status 125. In some examples, device data 123 can also identify a user associated with a client device 106. A device record can also store other device specific information, such as a device type, operating system type or version, applications that are required or optional for the device, or an enrollment status of the device. In this scenario, the device data 123 can also indicate whether a managed device is a computing device or a peripheral device, such as a printer, scanner, or other device that can be deployed in an environment and associated with a record in a directory service.

Various compliance rules can be enforced on client devices 106 that are enrolled as managed devices with the management service 116. For example, a compliance rule can specify that a client device 106 is required to be off or in a low power "sleep" state during a specified time period. Another compliance rule can specify that a client device 106 is required to be on or in a normal operation "awake" state during a specified time period. As another example, a compliance rule can specify that a client device 106 is prohibited from rendering content that has been designated as confidential.

Device groupings 127 can include one or more tables or other data structures that track information about client devices 106 to which the management service 116 sends notifications. The device groupings 127 can include grouping parameters 129. Grouping parameters 129 can include tags or parameters that can be assigned to devices that are managed by the management service 116. The grouping parameters 129 can include a device manufacturer, an operating system identifier, an operating system version identifier, a geographic location to which the device is assigned, an office location within the enterprise to which the device is assigned, an ownership identifier for the device, a user identifier, a management type that identifies the way in which the device is managed, an enrollment category that identifies the way the device is enrolled with the management service 116, a user group assigned to the device, and other parameters that can be supported by the management service 116 and/or created by an administrator.

User data 131 can represent information about users in an enterprise directory that have user accounts associated with the management service 116 or a directory service such as Active Directory, a single sign-on service. User data 131 can include usernames, email addresses, credentials, certificates, and other data associated with a user account in an enterprise directory or a management service 116.

User data 131 can also include user-grouping parameters 133. User-grouping parameters 133 can include tags or parameters that can be assigned to user accounts that are associated with the management service 116 or an enterprise directory. The user-grouping parameters 133 can include an organizational group, a group within an enterprise, a geographic location to which the user is assigned, an office location within the enterprise to which the user is assigned, a user identifier, a device with which the user is associated or assigned, and other parameters that can be supported by the management service 116, a directory service, and/or created by an administrator.

The management service 116 can allow an administrator to assign a client device 106 or a user account to a grouping based on the available grouping parameters 129 or user-grouping parameters 133. For example, an administrator can assign a client device 106 to more than one grouping according to multiple grouping parameters 129. A client device 106 can be assigned to a grouping based on its operating system and a different grouping based on the geographic location in which the client device 106 is expected to be used. The different groupings can have non-overlapping membership. Accordingly, if a notification is generated for a grouping, the management service 116 or messaging server 118 can be required to determine the membership of the groupings, which can be a computationally intensive task for large device populations that are managed by the management service 116.

The client device 106 can be a processor-based system such as a desktop computer, a laptop computer, a smartphone, a tablet computer system, and so on. The client device 106 includes a display that comprises, for example, one or more devices such as liquid crystal display (LCD) displays or other types of display devices. The client device 106 is equipped with networking capability or networking interfaces, including a localized networking or communication capability, thereby allowing the client device 106 to communicate with the computing environment 102 over the network 119.

The client device 106 executes various applications, such as a management component 145. The management component 145 can communicate with the management service 116 and manage the client device 106 on behalf of the management service 116. The management component 145 can provide visibility with respect to the operation status of the client device 106 and can be installed with elevated privileges on the client device 106 to facilitate management of the device. The client device 106 can be provisioned by the management service 116 by causing resources to be installed or stored on the client device 106 using the command queue maintained by the management service 116. The management service 116 can therefore permit or deny various services to the client device 106.

Once a client device 106 has been remotely provisioned and enrolled by the IT administrator, the activities of the client device 106 can be tracked by the management service 116. Compliance rules can also be stored on the client device 106, where the management component 145 reports any violations of compliance rules to the computing environment 102. The management component 145 can also receive commands from the management service 116 through the distributed notifications framework to install applications, profiles or other data on the device or carry out any other management commands on the device. Additionally, the management component 145 can receive informational notifications on the client device 106 that are displayed on a display of the device.

The management component 145 can also have a notification client 147, which can represent functionality within the management component 145 or a separate application running on the client device 106. The notification client 147 can implement client-side functionality associated with some implementations of the disclosure. The notification client 147 can obtain an indication from the messaging server 118 that a notification is available for the client device 106. The notification client 147 can then poll the management service 116 or the messaging server 118 to retrieve the notification and/or data within the notification.

In one example, the management service 116 can determine that a notification should be sent to a grouping of devices. The management service 116 can make such a determination in response to an administrator deploying an application, policy, or configuration profile for a grouping of devices. Accordingly, the management service 116 can request that the messaging server 118 send a notification indication to all of the devices that are managed by the management service 116 on behalf of an enterprise or on behalf of a larger grouping of devices, such as an organizational group.

The notification indication can be an indication that there is a notification available for a grouping of devices. The indication can include that grouping parameters that define the grouping of client devices 106. The notification client 147 can determine whether the client device 106 on which it is within the grouping. If so, the notification client 147 can request to retrieve or fetch the notification from the management service 116 or the messaging server 118. If the notification client 147 determines that the client device 106 does not fall within the grouping, the notification client 147 can ignore the indication The management component 145 can store information about groupings of devices within the management service 116 to which a managed device is assigned. For example, the management component 145 can be provisioned with the grouping parameters 129 when the device is enrolled with the management service 116. If the client device 106 is later added to a grouping by an administrator, the management service 116 can transmit an indication to the management component 145 that the device has been added to a grouping.

The management component 145 can also store information about user-grouping parameters 133 to which a user account associated with the client device 106 is assigned. If the user account is later added to a grouping by an administrator, the management service 116 can transmit an indication to the management component 145 that a user account has been added to a grouping.

Figure 2:
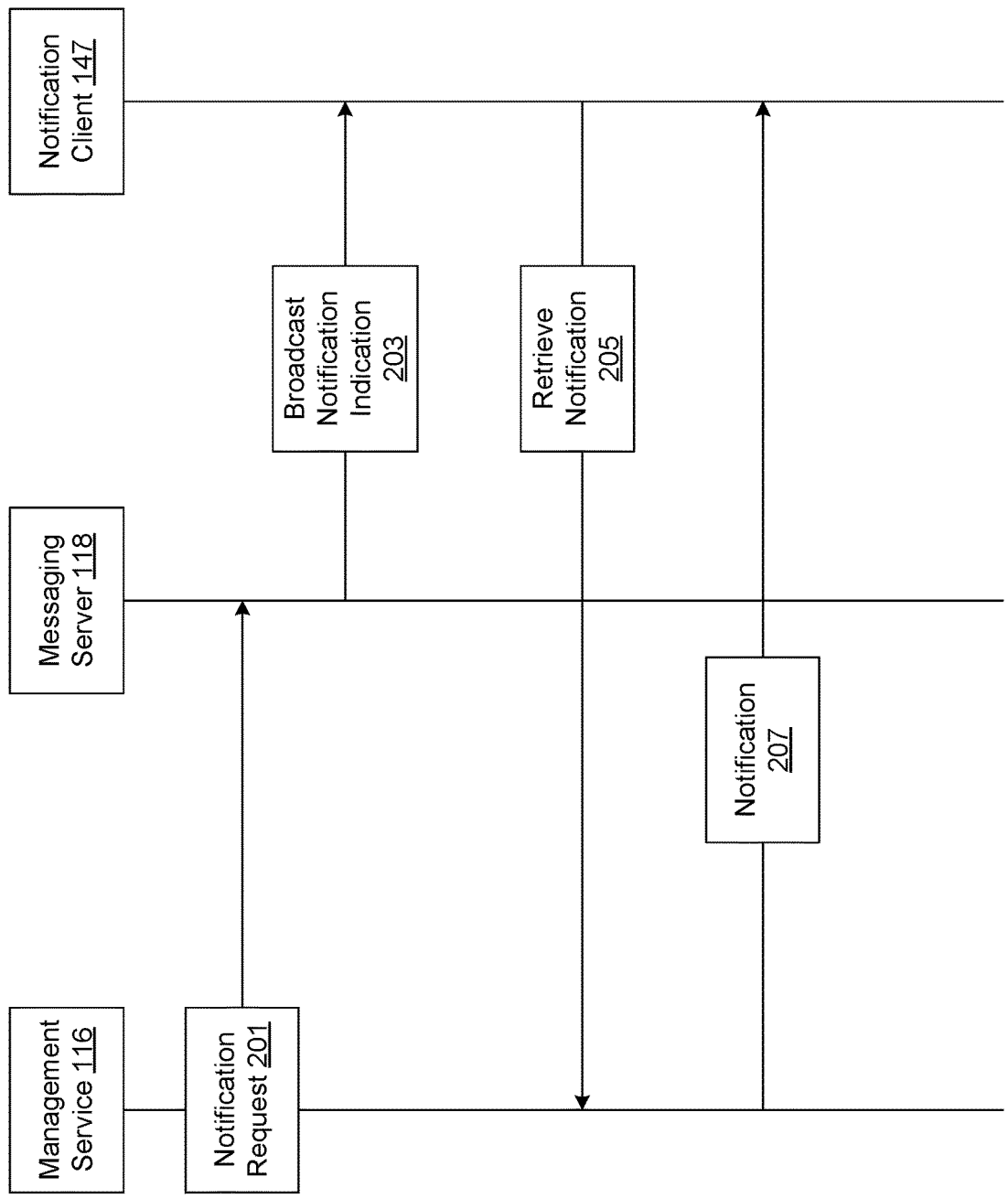
FIG. 2 is a sequence diagram that illustrates an example method according to examples of the disclosure.

Reference is now made to FIG. 2, which illustrates how notification framework according to the disclosure can be implemented. In the scenario shown in FIG. 2, the management service 116, at step 201, can determine that a notification should be sent to a grouping of devices that are managed by the management service 116. The management service 116 can send a notification request to the messaging server 118. The notification request can direct the messaging server 118 to send a message or indication to a population of client devices 106 along with one or more grouping parameter 129 or user-grouping parameters 133 that define a grouping of client devices 106 for which a notification has been generated.

The indication can be a message that the client device 106 should retrieve or request a notification if it satisfies the grouping parameters 129 or user-grouping parameters 133 that are also in the indication. The indication can also include an identifier that is a reference to the specific notification or data that the client device 106 should retrieve from the management service 116 or messaging server 118 upon receiving the indication.

At step 203, the messaging server 118 can broadcast the indication to the client devices 106. The indication can be sent to all the managed devices for a particular enterprise or all devices within an organization group. In other words, the indication can be sent to a larger grouping of client devices 106 than the grouping of client devices 106 for which the notification is generated. By sending the indication to a larger grouping of client devices 106, the management service 116 or messaging server 118 does not need to parse the grouping parameters associated with the grouping and determine which of the client devices 106 in the population of managed devices are in the grouping. This methodology can offload some of the computational tasks required by the management service 116 to send notifications to various groupings of managed devices.

At step 205, upon receiving the indication, the notification client 147 can send a request to the management service 116 to retrieve the notification if the client device 106 on which the notification client 147 is running is within the grouping defined by the grouping parameters in the indication received at step 203. The request to retrieve the notification can include one or more authentication credentials or parameters with which the management service 116 can authenticate the client device 106. The request can include a certificate or a reference to a certificate with which the management service 116 can authenticate the client device 106. Additionally, the request can include an identifier that identifies the notification that the notification client 147 is requesting to retrieve from the management service 116.

At step 207, the management service 116 can provide the requested notification to the notification client 147. The notification client 147 can then provide the notification to the management component 145. The notification can include a management command from the management service 116, which the management component 145 can carry out or execute on the client device 106. For example, the management command can include a command to install a specified application, configuration profile, certificate, or modify a setting on the client device 106. Because the management component 145 can be installed on the client device 106 with elevated or administrative privileges, the management component 145 can manage the client device 106 on behalf of the management service 116 can receive management commands in this way from the management service 116.

Figure 3:
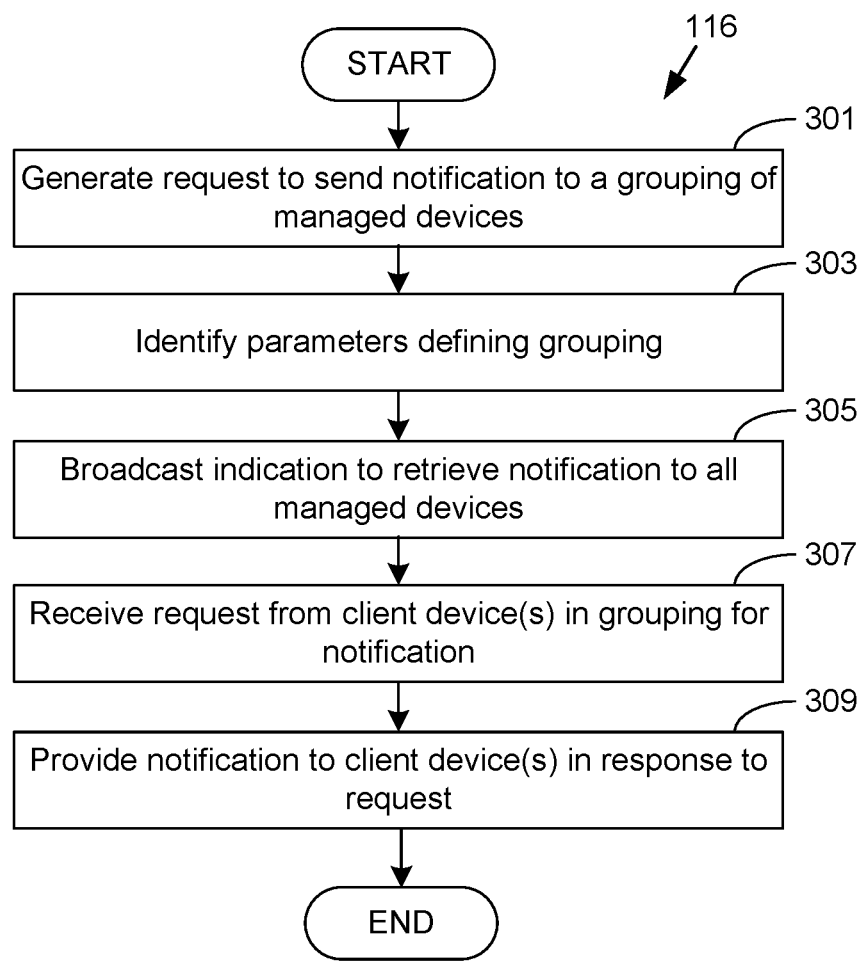
FIG. 3 is a flowchart that illustrates an example method according to examples of the disclosure.

Reference is made to FIG. 3, which is a flowchart that illustrates an example method of how the management service 116 can send notification or data to managed devices utilizing the notification framework disclosed herein.

Beginning at step 301, the management service 116 executing in the computing environment 102 generate a request to send a notification to a grouping of manage devices. The grouping can represent a subset of a larger population of managed devices associated with an enterprise or organizational grouping of devices. The management service 116 can determine that a notification should be sent to the devices as a result of a management command that the management service 116 is issuing to the devices. The notification can also be generated to communicate other data or information to the devices on behalf of the management service 116.

The notification can include a request for the management component 145 running on the devices in the grouping to take an action on the client device 106, such as a request to install an application, profile, certificate, policy, or other data on the client device 106 The notification can also include an informational notification that can be displayed by the management component 145 on the client device 106.

At step 303, the management service 116 can identify the parameters that define the grouping of client devices 106 receiving the notification. The grouping parameters can include grouping parameters 129 and user-grouping parameters 133 that can define the grouping for the notification. Grouping parameters can comprise one or more conditions that define a grouping of devices. The parameters can include device parameters that define aspects of a client device 106. A grouping of client devices 106 associated with a notification can include multiple grouping parameters. For example, a grouping can include all managed devices for a particular operating system and a particular device manager, which can be defined as two different grouping parameters 129.

At step 305, the management service 116 can cause the messaging server 118 to broadcast an indication that client devices 106 that are managed by the management service 116 should check in and retrieve a notification from the management service 116. The indication can be sent as a notification through a notifications framework provided by the operating system or that is implemented by the messaging server 118. For example, the indication can be sent through a messaging or notification server provided by an operating system provider for devices running the operating system. The indication can include the grouping parameters that define the grouping of devices. By including the grouping parameters, such as one or more grouping parameter 129 and user-grouping parameters 133, the management service 116 and messaging server 118 can rely upon devices that are enrolled as managed devices to determine whether they fall within a grouping of client devices 106 for which the notification is intended.

The indication can be sent to a larger grouping of client devices 106 within a population of client devices 106 that are managed by the management service 116. In some examples, the indication can be sent to all client devices 106 that are managed by the management service 116. In other examples, the indication can be sent to all client devices 106 in a particular organizational group as defined by a directory service utilized by the enterprise, such as Microsoft Active Directory. The indication can also include an identifier that identifies the notification that is being sent to the grouping of devices.

At step 307, the management service 116 can receive a request from one or more client devices 106 in the grouping. The request can be received once a client device 106 in the grouping processes the grouping parameters from the indication at step 305. The request can include an identifier that identifies the notification being requested. The request can also include authentication data with which the management service 116 can authenticate the requesting client device 106. The request can further include a device identifier and/or a user identifier associated with the client device 106.

At step 309, the management service 116 can transmit the notification data to the requesting client device 106. The notification can include the actual notification, command, or other data that the management service 116 requires to communicate to the grouping of client devices 106. Accordingly, if the management service 116 is sending a notification to the grouping of client devices 106, the indication at step 305 can withhold the actual notification data, and the actual notification data can be included in the notification that is transmitted to the requesting client device 106 at step 309.

Additionally, at step 309, the management service 116 can also authenticate the client device 106 as well as verify its membership in the grouping of client devices 106 before providing the notification to the client device 106. The membership in the grouping can be verified by verifying that the grouping parameters 129 and/or the user-grouping parameters 133 are consistent with the grouping associated with the notification. The management service 116 can determine the identity of the client device 106 by extracting a device or user identifier from the request received at step 307. Thereafter, the process proceeds to completion.

Figure 4:
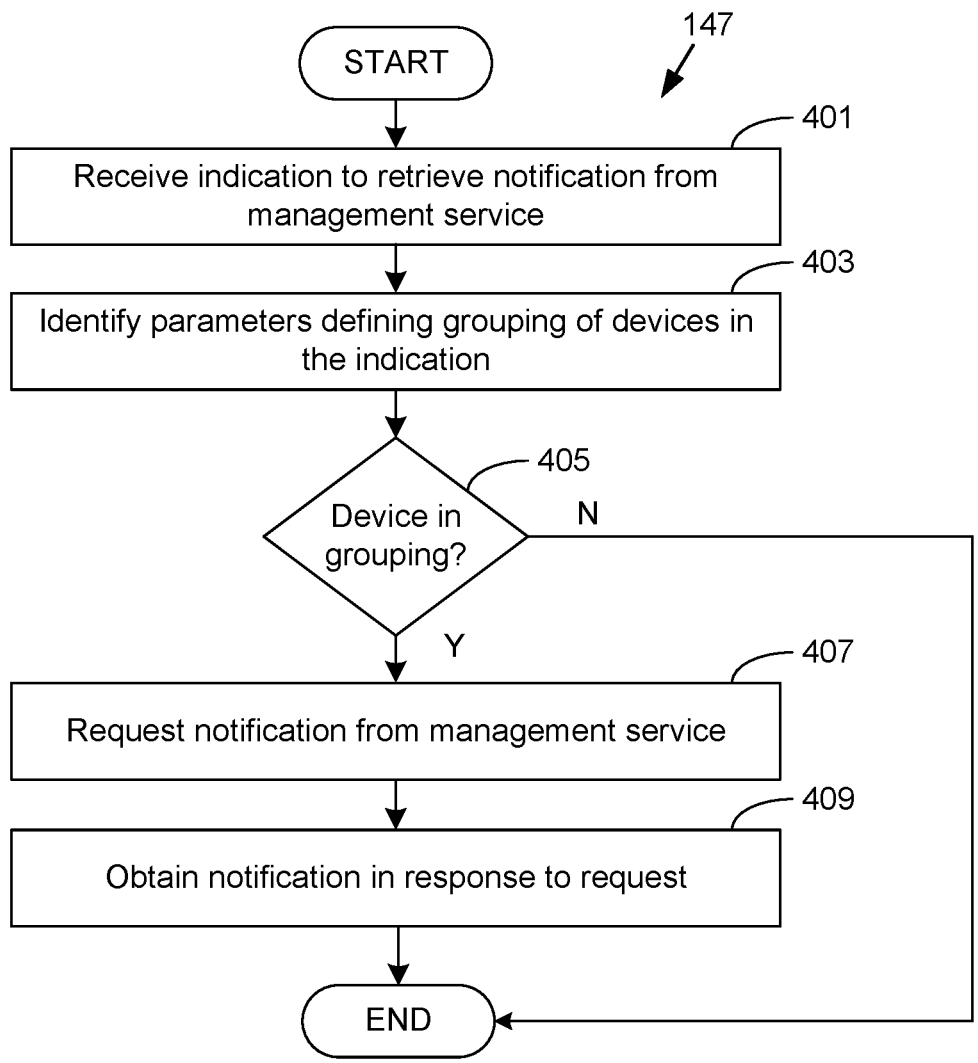
FIG. 4 is a flowchart that illustrates an example method according to examples of the disclosure.

Reference is made to FIG. 4, which is a flowchart that illustrates an example method of how notification client 147 can receive a notification according to a notifications framework according to examples of the disclosure.

At step 401, the notification client 147 can receive a notification indication from the management service 116 or messaging server 118. The indication can be an indication that a notification for a grouping of client devices 106 is available for retrieval from the management service 116. The indication can include the grouping parameters, such as the grouping parameters 129 and/or the user-grouping parameters 133 associated with grouping of client devices that are intended to receive the notification. The notification client 147 can extract the grouping parameters from the indication.

At step 403, the notification client 147 can identify the grouping parameters in the indication. The grouping parameters can be included in a data structure in the indication. At step 405, the notification client 147 can determine whether the client device 106 on which the notification client 147 is running falls within the grouping of client devices 106 defined by the grouping parameters. The notification client 147 can consult the management component 145 or other information accessible on the client device 106 that defines the grouping parameters that are applicable to the client device 106. For example, when the client device 106 is enrolled as a managed device with the management service 116, the management component 145 can be provisioned with the grouping parameters that are associated with the client device 106 as well as a user account associated with the client device 106.

If the client device 106 executing the notification client 147 determines that the client device 106 on which it is running is not within the grouping, the process proceeds from step 405 to completion. By determining that the client device 106 is not within the grouping, the notification client 147 has removed some of the computational load associated with determining the members of a grouping of a devices. Accordingly, to send a notification to the device grouping, the management service 116 and/or messaging server 118 need only include the grouping parameters defining the device grouping in the indication that is sent to all managed devices, or at least to a larger grouping of managed devices.

If, at step 405, the notification client 147 determines that the client device 106 is within the device grouping, the process can proceed to step 407. At step 407, the notification client 147 can request the notification from the management service 116. The request can include an identifier corresponding to the notification. The identifier can be included in the indication obtained at step 401. The request can also include one or more authentication credentials that can be used to authenticate the client device 106 with the management service 116.

At step 409, the notification client 147 can obtain the notification from the management service 116. In some implementations, the notification client 147 can cause the management service 116 to direct the notification to the client device 106 through a notifications framework provided by an operating system provider. The notification can be an informational notification or a command that can be carried out by the management component 145 on the client device 106. Thereafter, the process proceeds to completion.

The flowcharts and sequence diagram of FIGS. 2-4 show examples of the functionality and operation of components described herein. The components described herein can be embodied in hardware, software, or a combination of hardware and software. If embodied in software, each element can represent a module of code or a portion of code that includes program instructions to implement the specified logical function(s). The program instructions can be embodied in the form of, for example, source code that includes human-readable statements written in a programming language or machine code that includes machine instructions recognizable by a suitable execution system, such as a processor in a computer system or other system. If embodied in hardware, each element can represent a circuit or several interconnected circuits that implement the specified logical function(s).

Although the flowchart and sequence diagram show a specific order of execution, it is understood that the order of execution can differ from that which is shown. For example, the order of execution of two or more elements can be switched relative to the order shown. Also, two or more elements shown in succession can be executed concurrently or with partial concurrence. Further, in some examples, one or more of the elements shown in the flowcharts can be skipped or omitted.

The various components described herein can include at least one processing circuit, where such a processing circuit can include, for example, one or more processors and one or more storage devices that are coupled to a local interface. The local interface can include, for example, a data bus with an accompanying address/control bus or any other suitable bus structure.

The various components described herein can be embodied in the form of hardware, as software components that are executable by hardware, or as a combination of software and hardware. If embodied as hardware, the components described herein can be implemented as a circuit or state machine that employs any suitable hardware technology.

One or more of the components described herein that include software or program instructions can be embodied in any non-transitory computer-readable medium for use by or in connection with an instruction execution system such as, a processor in a computer system or other system. The computer-readable medium can contain, store, and/or maintain the software or program instructions for use by or in connection with the instruction execution system.

The above-described embodiments of the present disclosure are merely possible examples of implementations set forth for a clear understanding of the principles of the disclosure. Many variations and modifications can be made to the above-described embodiment(s) without departing substantially from the spirit and principles of the disclosure. All such modifications and variations are intended to be included herein within the scope of this disclosure and protected by the following claims.

At least the following is claimed:

1. A method for sending notifications to a grouping of client devices, the method comprising:
   generating a request to send a notification to the grouping of client devices, the grouping of client devices comprising a subset of a population of client devices that are managed by a management service;
   identifying at least one condition defining the grouping of client devices;
   broadcasting an indication to the population of client devices to fetch a notification from the management service, the indication comprising the at least one condition;
   receiving a request from a client device from the population of client devices to retrieve the notification, wherein the client device determined that the client device met the at least one condition and wherein at least one other client device from the population of devices determined that the at least one other client device is not within the grouping of client devices so that a computational task to determine members of the grouping is offloaded to the population of client devices that are managed by the management service so that the client devices perform the task of determining whether a respective client device met the at least one condition; and
   providing the notification to the client device.

2. The method of claim 1, wherein the at least one condition comprises at least one device parameter defining the grouping of client devices, the at least one device parameter describing at least one aspect of the grouping of client devices.

3. The method of claim 2, wherein the at least one device parameter comprises an operating system, an operating system version, a device model, an enrollment category, or a user parameter.

4. The method of claim 1, further comprising transmitting a configuration profile to the client device, the configuration profile further comprises a device profile associated with the grouping of client devices.

5. The method of claim 1, further comprising causing the grouping of client devices to install a specified application, wherein the notification comprises a location from which the specified application can be obtained by the grouping of client devices.

6. The method of claim 1, wherein the at least one condition comprises a user parameter defining the grouping of the client devices, the user parameter specifying a condition associated with an identity of a user assigned to the client device.

7. The method of claim 6, wherein the user parameter specifies a role within a directory service.

8. A system for sending notifications within a grouping of client devices comprising:
   at least one computing device; and
   at least one application executed by the at least one computing device, the at least one application causing the at least one computing device to at least:
      generate a request to send a notification to the grouping of client devices, the grouping of client devices comprising a subset of a population of client devices that are managed by a management service;
      identify at least one condition defining the grouping of client devices;
      broadcast an indication to the population of client devices to fetch a notification from the management service, the indication comprising the at least one condition;
      receive a request from a client device from the population of client devices to retrieve the notification, wherein the client device determined that the client device met the at least one condition and wherein at least one other client device from the population of devices determined that the at least one other client device is not within the grouping of client devices so that a computational task to determine members of the grouping is offloaded to the population of client devices that are managed by the management service so that the client devices perform the task of determining whether a respective client device met the at least one condition; and
      provide the notification to the client device.

9. The system of claim 8, wherein the at least one condition comprises at least one device parameter defining the grouping of client devices, the at least one device parameter describing at least one aspect of the grouping of client devices.

10. The system of claim 9, wherein the at least one device parameter comprises an operating system, an operating system version, a device model, an enrollment category, or a user parameter.

11. The system of claim 8, wherein the at least one application further causes the at least one computing device to at least transmit a configuration profile to the client device, the configuration profile further comprises a device profile associated with the grouping of client devices.

12. The system of claim 8, wherein the at least one application further causes the at least one computing device to cause the grouping of client devices to install a specified application, wherein the notification comprises a location from which the specified application can be obtained by the grouping of client devices.

13. The system of claim 8, wherein the at least one condition comprises a user parameter defining the grouping of the client devices, the user parameter specifying a condition associated with an identity of a user assigned to the client device.

14. The system of claim 13, wherein the user parameter specifies a role within a directory service.

15. A non-transitory computer-readable medium storing a plurality of computer instructions executable by a computing device, wherein the plurality of computer instructions cause the computing device to at least:
   generate a request to send a notification to a grouping of client devices, the grouping of client devices comprising a subset of a population of client devices that are managed by a management service;
   identify at least one condition defining the grouping of client devices;
   broadcast an indication to the population of client devices to fetch a notification from the management service, the indication comprising the at least one condition;

receive a request from a client device from the population of client devices to retrieve the notification, wherein the client device determined that the client device met the at least one condition and wherein at least one other client device from the population of devices determined that the at least one other client device is not within the grouping of client devices so that a computational task to determine members of the grouping is offloaded to the population of client devices that are managed by the management service so that the client devices perform the task of determining whether a respective client device met the at least one condition; and provide the notification to the client device.

16. The non-transitory computer-readable medium of claim 15, wherein the at least one condition comprises at least one device parameter defining the grouping of client devices, the at least one device parameter describing at least one aspect of the grouping of client devices.

17. The non-transitory computer-readable medium of claim 16 wherein the at least one device parameter comprises an operating system, an operating system version, a device model, an enrollment category, or a user parameter.

18. The non-transitory computer-readable medium of claim 15, wherein the plurality of computer instructions further cause the computing device to at least transmit a configuration profile to the client device, the configuration profile further comprises a device profile associated with the grouping of client devices.

19. The non-transitory computer-readable medium of claim 15, wherein the plurality of computer instructions further cause the computing device to cause the grouping of client devices to install a specified application, wherein the notification comprises a location from which the specified application can be obtained by the grouping of client devices.

20. The non-transitory computer-readable medium of claim 15, wherein the plurality of computer instructions further cause the computing device to cause the grouping of client devices to install a specified application, wherein the notification comprises a location from which the specified application can be obtained by the grouping of client devices.

21. The non-transitory computer-readable medium of claim 15, wherein the at least one condition comprises a user parameter defining the grouping of the client devices, the user parameter specifying a condition associated with an identity of a user assigned to the client device.

* * * * *